United States Patent
Shaffer et al.

(10) Patent No.: US 8,145,249 B2
(45) Date of Patent: Mar. 27, 2012

(54) METHOD AND SYSTEM FOR PROVIDING A PROXY MEDIA SERVICE

(75) Inventors: Shmuel Shaffer, Palo Alto, CA (US);
Shah Talukder, Los Gatos, CA (US);
Kittur V. Nagesh, Saratoga, CA (US);
Douglas J. Hall, Westerville, OH (US);
Larry R. Metzger, Wake Forest, NC (US); Yogesh Kalley, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 1233 days.

(21) Appl. No.: 11/267,915

(22) Filed: Nov. 4, 2005

(65) Prior Publication Data

US 2007/0105579 A1 May 10, 2007

(51) Int. Cl.
*H04B 7/00* (2006.01)
(52) U.S. Cl. .................. 455/518; 455/519; 370/338
(58) Field of Classification Search .......... 455/518–521;
379/338, 310, 312, 348, 433, 432
See application file for complete search history.

(56) References Cited

U.S. PATENT DOCUMENTS

| | | | |
|---|---|---|---|
| 3,864,746 A | 2/1975 | Burgess | |
| 5,734,707 A | 3/1998 | El-Wailly | |
| 5,757,897 A | 5/1998 | LaBarbera et al. | |
| 5,938,721 A | 8/1999 | Dussell et al. | 701/211 |
| 6,014,086 A | 1/2000 | Miyashita | |
| 6,094,578 A | 7/2000 | Purcell et al. | 455/426 |
| 6,185,205 B1 | 2/2001 | Sharrit et al. | 370/389 |
| 6,233,315 B1 | 5/2001 | Reformato et al. | 379/88.01 |
| 6,430,602 B1 | 8/2002 | Kay et al. | 709/206 |
| 6,446,004 B1 | 9/2002 | Cao et al. | 701/213 |
| 6,477,150 B1 | 11/2002 | Maggenti et al. | |
| 6,484,033 B2 | 11/2002 | Murray | 455/456 |
| 6,650,902 B1 | 11/2003 | Richton | 455/456.3 |
| 6,678,613 B2 | 1/2004 | Andrews et al. | 701/213 |
| 6,775,689 B1 | 8/2004 | Raghunandan | 709/206 |
| 6,798,755 B2 * | 9/2004 | Lillie et al. | 370/312 |
| 6,912,389 B2 | 6/2005 | Bright et al. | 455/433 |
| 6,928,294 B2 | 8/2005 | Maggenti et al. | 455/518 |
| 7,155,248 B2 | 12/2006 | Idnani | |
| 7,170,863 B1 * | 1/2007 | Denman et al. | 370/260 |
| 7,386,000 B2 * | 6/2008 | Lopponen et al. | 370/433 |
| 7,433,680 B2 | 10/2008 | Jenkins et al. | |
| 2002/0075305 A1 | 6/2002 | Beaton et al. | 345/751 |
| 2002/0077136 A1 | 6/2002 | Maggenti et al. | |
| 2002/0150091 A1 | 10/2002 | Lopponen et al. | |

(Continued)

OTHER PUBLICATIONS

Patent Cooperation Treaty, From the International Searching Authority, Invitation to Pay Additional Fees and, Where Applicable, Protest Fee in International Application No. PCT/US2006/041675, dated Dec. 10, 2008, 2 pages.

(Continued)

*Primary Examiner* — Nay A Maung
*Assistant Examiner* — Angelica Perez
(74) *Attorney, Agent, or Firm* — Baker Botts L.L.P.

(57) ABSTRACT

A method for providing a push-to-talk proxy media service includes receiving a plurality of monitored push-to-talk communication streams over a high bandwidth connection and mixing the plurality of monitored push-to-talk communication streams into a mixed communication stream. The method also includes transmitting the mixed communication stream to a user endpoint over a low bandwidth connection.

39 Claims, 4 Drawing Sheets

U.S. PATENT DOCUMENTS

| | | |
|---|---|---|
| 2003/0063580 A1 | 4/2003 | Pond |
| 2003/0224762 A1 | 12/2003 | Lau et al. ............... 455/412.2 |
| 2003/0224825 A1 | 12/2003 | Cox et al. |
| 2003/0225589 A1 | 12/2003 | Eaton et al. ................... 705/1 |
| 2004/0190489 A1 | 9/2004 | Palaez et al. |
| 2004/0192364 A1 | 9/2004 | Ranalli et al. |
| 2004/0198425 A1 | 10/2004 | Mellone et al. |
| 2004/0204151 A1 | 10/2004 | Muthuswamy et al. |
| 2005/0054361 A1 | 3/2005 | Turcanu et al. |
| 2005/0122923 A1 | 6/2005 | Jang et al. |
| 2005/0122937 A1 | 6/2005 | Hart et al. ..................... 370/335 |
| 2005/0124290 A1 | 6/2005 | Bostrom et al. |
| 2005/0182816 A1 | 8/2005 | Lin et al. ..................... 709/200 |
| 2005/0220079 A1 | 10/2005 | Asokan ........................ 370/352 |
| 2006/0014498 A1 | 1/2006 | Yau et al. .................... 455/90.2 |
| 2006/0040689 A1 | 2/2006 | Yoon et al. |
| 2006/0056689 A1 | 3/2006 | Wittebrood et al. .......... 382/173 |
| 2006/0154681 A1 | 7/2006 | Park et al. ..................... 455/518 |
| 2006/0168346 A1 | 7/2006 | Chen et al. .................... 709/246 |
| 2006/0229093 A1 | 10/2006 | Bhutiani et al. ............... 455/518 |
| 2006/0239235 A1 | 10/2006 | Oswal et al. |
| 2006/0270361 A1 | 11/2006 | Szymanski et al. |
| 2007/0104121 A1 | 5/2007 | Shaffer et al. ................. 370/276 |
| 2007/0105578 A1 | 5/2007 | Shaffer et al. ................. 455/518 |
| 2007/0105579 A1 | 5/2007 | Shaffer et al. ................. 455/519 |
| 2007/0133435 A1 | 6/2007 | Eneroth et al. ................ 370/260 |
| 2007/0192428 A1 | 8/2007 | Goldfarb et al. |
| 2007/0220169 A1 | 9/2007 | Silver et al. ................... 709/246 |
| 2008/0102869 A1 | 5/2008 | Shaffer et al. ................. 455/518 |

OTHER PUBLICATIONS

PCT Notification of transmittal of the International Search Report and the Written Opinion of the International Searching Authority, or the Declaration, mailed Feb. 10, 2009 in reference to PCT/US2006/041675 filed Oct. 26, 2006.

Unknown author, Motorola T8550RCAMO specification, 123 radios, Sep. 8, 2008 (2 pages).

Crawford, SX700R, CS online, Feb. 18, 2006 (5 pages).

Unknown author, NOAA Weather Radio All Hazards, National Weather Service, description of weather radio, Feb. 4, 2005 (4 pages).

Shaffer, et al., U.S. Appl. No. 11/267,645, filed Nov. 4, 2005, Communication from the U.S. Patent Office dated Sep. 18, 2008.

Shaffer, et al., U.S. Appl. No. 11/267,645, filed Nov. 4, 2005, Communication from the U.S. Patent Office dated Apr. 23, 2009.

Shaffer, et al., U.S. Appl. No. 11/267,693, filed Nov. 4, 2005, Communication from the U.S. Patent Office dated Feb. 26, 2008.

Shaffer, et al., U.S. Appl. No. 11/267,693, filed Nov. 4, 2005, Communication from the U.S. Patent Office dated Sep. 17, 2008.

Shaffer, et al., U.S. Appl. No. 11/388,461 filed Mar. 24, 2006, Communication from the U.S. Patent Office dated Oct. 30, 2008.

Shaffer, et al., U.S. Appl. No. 11/388,461, filed Mar. 24, 2006, entitled *Automatically Providing Announcements for a Push-to-Talk Communication Session*.

Shaffer, et al., U.S. Appl. No. 11/554,210 filed Oct. 30, 2006, entitled *Method and System for Providing Information About a Push-to-Talk Communication Session*.

Dennis, Patrick; Draft of document entitled "Land Mobile Radio (LMR) Standing Operating Procedures (SOP);" Department of the Army, Fort Gordon, GA (5 pages).

Cisco Land Mobile Radio Gateway, Data Sheet, Copyright © 1992-2005 Cisco Systems, Inc. www.cisco.com (6 pages).

Cisco IP Interoperability and Collaboration System, Q&A, Copyright © 1992-2005 Cisco Systems, Inc. www.cisco.com (4 pages).

Cisco IPICS, Solution Overview, Copyright © 1992-2005 Cisco Systems, Inc., www.cisco.com/go/ipics (6 pages).

Matthews, Dr. J. W., *A New Interoperability Paradigm, A Concept Proposal*, Worcester Polytechnic Institute, Mar. 2006 (15 pages).

Shaffer, et al., U.S. Appl. No. 11/388,461, filed Mar. 24, 2006, Communication from the U.S. Patent Office dated Jun. 1, 2009.

Shaffer, et al., U.S. Appl. No. 11/388,461, filed Mar. 24, 2006, Office Action from the U.S. Patent Office dated Sep. 16, 2009, 25 pages.

Shaffer, et al., U.S. Appl. No. 11/267,645, filed Nov. 4, 2005, Office Action from U.S. Patent and Trademark Office dated Sep. 30, 2009, 14 pages.

Communication from European Patent Office in the Netherlands mailed Sep. 30, 2009 regarding PCT/US2006/041675.

Shaffer et al., U.S. Appl. No. 11/267,693, filed Nov. 4, 2005, Communication from the U.S. Patent and Trademark Office mailed Feb. 22, 2010.

Shaffer et al., U.S. Appl. No. 11/554,210, filed Oct. 30, 2006, Office Action from the U.S. Patent and Trademark Office mailed Feb. 2, 2010.

Shaffer et al., U.S. Appl. No. 11/267,693, Final Office Action from the United States Patent and Trademark Office mailed Aug. 3, 2010.

NetworkFirst Interoperability Solved, Data Sheet, M/A-COM, Inc., ECR-7018A, http://www.networkfirst.com/resources/pdf/NetworkFirstRevised5_03.pdf, 6 pages.

Network Solution:, Information Sheet, NetworkFirst, M/A-COM, Inc., http://www.networkfirst.com/features/solution, 2 pages.

It's Our Network That Makes the Difference, Information Sheet, OpenSky Network, M/A-COM, Inc., http://www.opensky.com/network/index.asp, 2 pages.

Network Management, Information Sheet, OpenSky Network, M/A-COM, Inc., http://www.opensky.com/network/netmgmtsys.asp, 2 pages.

ACU-1000™ Interoperability NOW™, Information Sheet, Raytheon JPS Communications, http://www.jps.com/downloads/PDFS/acuupgrade.pdf, 4 pages.

Interoperability Gateway, OpenSky, NetworkFirst, P25$^{IP}$, Data Sheet, M/A-COM, Inc ECR-7054, http://www opensky.com/network/7054.pdf, 2 pages.

C3 Maestro$^{IP}$Dispatch Console, OpenSky, NetworkFirst, P25$^{IP}$, Data Sheet, M/A-COM, Inc. ECR-7160A, http://www.opensky.com/network/7160.pdf, 2 pages.

V$^{IP}$ Dispatch Console, OpenSky, NetworkFirst, P25$^{IP}$, Data Sheet, M/A-COM, Inc. ECR-7241B, http://www.opensky.com/network/7241B.pdf, 2 pages.

J. Polk, et al., Dynamic Host Configuration Protocol Option for Coordinate-based Location Configuration Information, Network Working Group, Internet RFC 3825, Category: Standards Track, The Internet Society, 15 pages, Jul. 2004.

OnStar Technology, Information Sheet, OnStar Corp., http://www.onstar.com/us_english/jsp/explore/onstar_basics/technology.jsp, 3 pages, 2005.

Patent Application U.S. Appl. No. 11/149,041 entitled, "*Method and System for Communicating Using Position Information*", 39 pages specification, claims and abstract, 3 pages of drawings, inventors Shmuel (nmi) Shaffer, et al., Jun. 8, 2005.

Patent Application U.S. Appl. No. 11/201,832 entitled, "*Method and System for Automatic Configuration of Virtual Talk Groups Based on Location of Media Source*", 65 pages specification, claims and abstract, 6 pages of drawings, inventors Shmuel (nmi) Shaffer, et al., Aug. 10, 2005.

Patent Application U.S. Appl. No. 11/202,400 entitled, "*Method and System for Communicating Media Based on Location of Media Source*", 66 pages specification, claims and abstract, 6 pages of drawings, inventors Shmuel (nmi) Shaffer, et al., Aug. 10, 2005.

Patent Application U.S. Appl. No. 11/202,403 entitled, "*Method and System for Providing Interoperable Communications with Location Information*", 66 pages specification, claims and abstract, 6 pages of drawings, inventors Shmuel (nmi) Shaffer, et al., Aug. 10, 2005.

Patent Application entitled, "*Method and System for Providing a Push-To-Talk Communication Session*", 63 pages specification, claims and abstract, 4 pages of drawings, inventors Shmuel (nmi) Shaffer, et al., Nov. 4, 2005.

Patent Application entitled, "*Method and System for Providing a Push-To-Talk Communication Session Using a Control Endpoint*", 65 pages specification, claims and abstract, 4 pages of drawings, inventors Shmuel (nmi) Shaffer, et al., Nov. 4, 2005.

\* cited by examiner

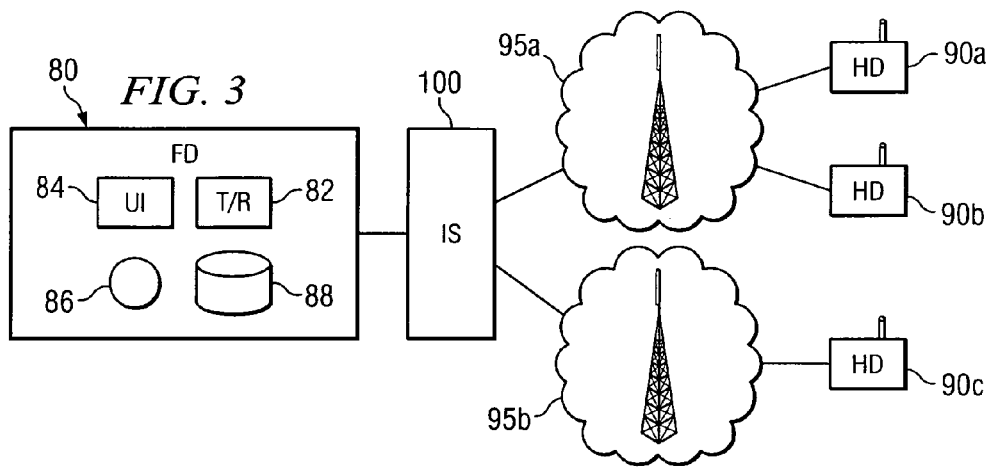
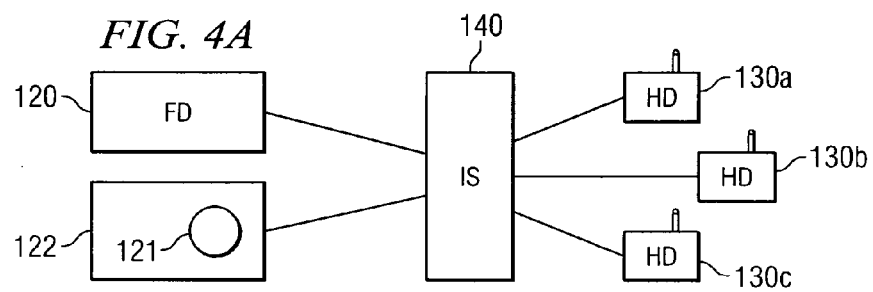
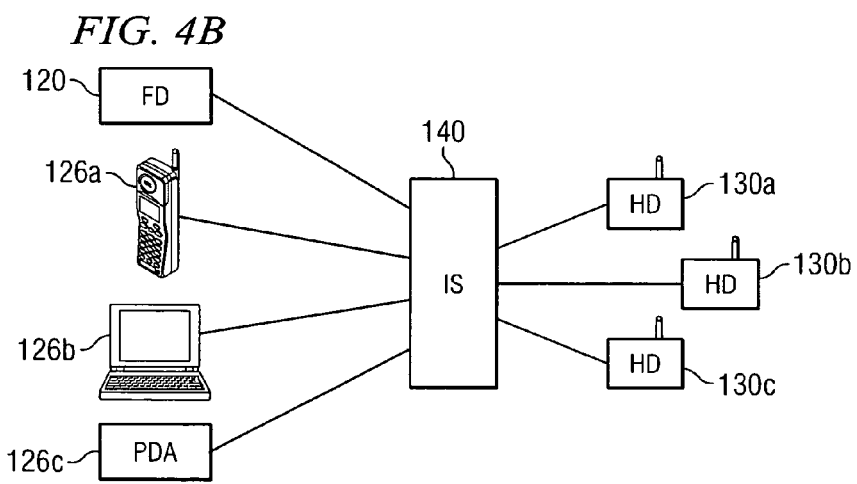

METHOD AND SYSTEM FOR PROVIDING A PROXY MEDIA SERVICE

RELATED APPLICATIONS

This application is related to U.S. patent application Ser. No. 11/267,645, entitled "METHOD AND SYSTEM FOR PROVIDING A PUSH-TO-TALK COMMUNICATION SESSION", filed concurrently with the present application, and to U.S. patent application Ser. No. 11/267,693, entitled "METHOD AND SYSTEM FOR PROVIDING A PUSH-TO-TALK COMMUNICATION SESSION USING A CONTROL ENDPOINT,", filed concurrently with the present application.

TECHNICAL FIELD OF THE INVENTION

This invention relates in general to communication systems and, more particularly, to a method and system for providing a proxy media service.

BACKGROUND OF THE INVENTION

Many public and private groups, such as security and safety personnel (e.g., police, fire fighters and ambulance drivers) use various communication networks of differing technologies and types for communication. Many networks utilize land mobile radios communicating through push-to-talk technologies. However, communications among different endpoints of different networks such as endpoints of different police, fire or other security networks may be difficult. Collaboration between the different agencies and networks tends to be ad hoc and inefficient. When achieved, it often involves laborious manual intervention. Organizations working towards interoperability solutions include Raytheon JPS Communications, IP Blue, Twisted Pair, M/A-COM, Motorola and Cisco Systems.

In addition, many networks of public and private groups, such as security and safety personnel, utilize push-to-talk technology to enable communications among members of a particular group. Groups members may communicate using push-to-talk endpoints, such as land mobile radios. These endpoints are typically half duplex endpoints such that they cannot support both outgoing and incoming communications at one time.

SUMMARY OF THE INVENTION

The present invention on provides a method and system for providing a proxy media service that substantially eliminates or reduces at least some of the disadvantages and problems associated with previous methods and systems.

In accordance with a particular embodiment, a method for providing a push-to-talk communication session includes facilitating a push-to-talk communication session among a full duplex endpoint supporting simultaneous two-way communication and a plurality of half duplex endpoints. Communications are received from and transmitted to the full duplex endpoint along a two-way communications path. The method includes blocking communications received from the full duplex endpoint while one of the plurality of half duplex endpoints has floor control in the communication session and receiving from the full duplex endpoint in the two-way communications path a floor control signal comprising a request to transmit communications in the communication session. The method includes, in response to receiving the floor control signal, providing floor control to the full duplex endpoint and transmitting to the plurality of half duplex endpoints communications received from the full duplex endpoint.

In accordance with another embodiment, a method for providing a push-to-talk communication session using a control endpoint includes facilitating a push-to-talk communication session among a full duplex endpoint supporting simultaneous two-way communication and a plurality of half duplex endpoints. Communications are received from and transmitted to the full duplex endpoint along a two-way communications path. The method includes blocking communications received from the full duplex endpoint while one of the plurality of half duplex endpoints has floor control in the communication session and receiving, from a control endpoint separate from the full duplex endpoint, a floor control signal comprising a request to transmit communications in the communication session. The method includes, in response to receiving the floor control signal, providing floor control to the full duplex endpoint and transmitting to the plurality of half duplex endpoints communications received from the full duplex endpoint.

In accordance with another embodiment, a method for providing a push-to-talk proxy media service includes receiving a plurality of monitored push-to-talk communication streams over a high bandwidth connection and mixing the plurality of monitored push-to-talk communication streams into a mixed communication stream. The method also includes transmitting the mixed communication stream to a user endpoint over a low bandwidth connection.

Technical advantages of particular embodiments include the ability of a user of a full duplex endpoint to communicate in a push-to-talk communication session with half duplex endpoints. Moreover, in some cases the user may utilize an endpoint different from the full duplex endpoint to control the floor in a push-to-talk communication session. Moreover, particular embodiments provide a proxy media service to enable a user to monitor a plurality of communication sessions, such as a plurality of PTT communication sessions, over a connection with an interoperability system through a low bandwidth network, such as a WAN. Thus, the ability to monitor many communication sessions is provided to users despite the lack of high bandwidth access to the interoperability system. This may provide users with the ability to monitor such communication sessions from home, for example, over a DSL or other connection instead of having to monitor from a company's or other organization's high bandwidth LAN.

Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

For a more complete understanding of the present invention and its advantages, reference is now made to the following description, taken in conjunction with the accompanying drawings, in which:

FIG. 3 illustrates an example system for providing a push-to-talk communication session among a full duplex endpoint and a plurality of half duplex endpoints, in accordance with a particular embodiment;

FIG. 4A illustrates an example system for providing a push-to-talk communication session using a control endpoint, in accordance with a particular embodiment;

FIG. 4B illustrates another example system for providing a push-to-talk communication session using a control endpoint, in accordance with a particular embodiment;

DETAILED DESCRIPTION

Figure 1:
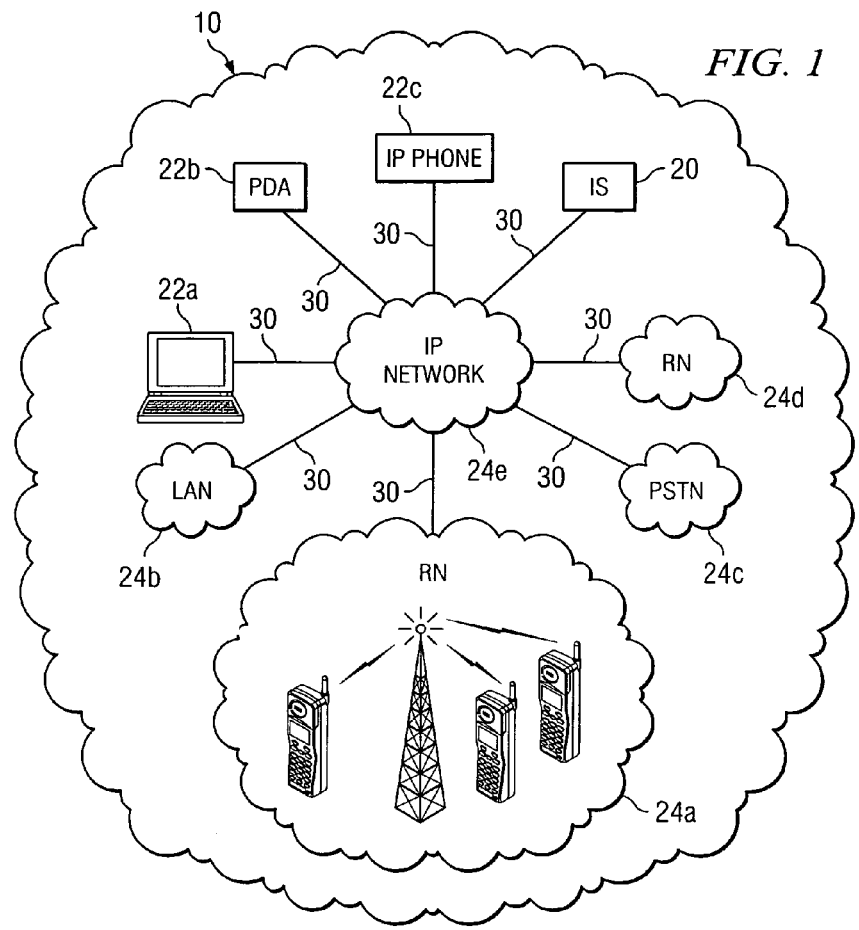
FIG. 1 illustrates a communication system with various communication networks and an interoperability system, in accordance with a particular embodiment.

FIG. 1 illustrates a communication system 10, in accordance with a particular embodiment. Communication system 10 includes communication networks 24a-24e, interoperability system (IS) 20 and endpoints 22a-22c. IS 20 is able to facilitate interoperable communication sessions between and among various communication devices, such as endpoints of communication networks 24 and endpoints 22. IS 20 uses a systems approach to offer a framework based on IP protocols and services to immediately achieve secure voice, video and other data interoperability among communication endpoints and networks utilizing different technologies.

Particular embodiments provide a user of a full duplex endpoint to communicate in a communication session with push-to-talk (PTT) half duplex endpoints. In general, a full duplex endpoint is capable of sending and receiving communications at the same time (e.g., along a 2-way communications path). A half duplex endpoint can only send or receive communications at the same time (e.g., it cannot support simultaneous 2-way communication). Thus, to effectively communicate with a half duplex endpoint, only one party can talk at any one time as only one channel is available. Therefore, to speak in a PTT manner with another half-duplex PTT endpoint, a user must "control the floor" by pressing and/or otherwise activating a PTT button which sends a signal to other PTT endpoint(s) on the channel or frequency to let them know that the user has control of the floor. This is in contrast to full duplex endpoints, such as typical telephones which can both send and receive communications at once because outgoing and incoming communications are sent along separate channels or, in other words, along a 2-way communications path.

Particular embodiments facilitate interoperable PTT communications among PTT half-duplex endpoints and a full duplex endpoint through, for example, an interoperability system. The system provides a user of the full duplex endpoint with various methods for controlling the floor in order to communicate with the half duplex endpoints. In some embodiments a DTMF or other signal may be communicated through the main communications path through which normal media communications are carried. In some cases a separate control endpoint may be used for the floor control signal. When the full duplex endpoint does not have floor control in a PTT session, the system may block any communications from the full duplex endpoint to allow the half duplex endpoints to communicate in the session. Thus, PTT functionality is provided to full duplex endpoints for interoperable communications with half duplex PTT endpoints of other communication networks.

Moreover, particular embodiments provide a proxy media service to enable a user to monitor a plurality of communication sessions, such as a plurality of PTT communication sessions, over a connection with an interoperability system through a low bandwidth network, such as a WAN. A proxy media system may mix streams from the plurality of communication sessions for effective communication to the user over the low bandwidth network. Thus, the ability to monitor many communication sessions is provided to users despite the lack of high bandwidth access to the interoperability system. This may provide users with the ability to monitor such communication sessions from home, for example, over a DSL or other connection instead of having to monitor from a company's or other organization's high bandwidth LAN.

In the illustrated embodiment, communication networks 24a and 24d comprise radio networks (RNs), communication network 24b comprises a local area network (LAN), communication network 24c comprises a PSTN and communication network 24e comprises an IP network. It should be understood, however, that communication system 10 may comprise any number of IP or non-IP communication networks of any wireless or wireline form capable of communicating audio and/or video telecommunication signals, data, and/or messages, including signals, data or messages. Communication networks 24a-24e may include any number and combination of segments, nodes and endpoints to enable communication among network devices and components. Communication networks 24a-24e may be distributed locally or across multiple cities and geographic regions. Nodes may include any combination of network components, gatekeepers, call managers, conference bridges, routers, hubs, switches, gateways, base stations, endpoints or other hardware, software or embedded logic implementing any number of communication protocols that allow for the exchange of data in communication system 10. Segments 30, which may comprise any suitable wireless or wireline communication links, including one or more communication networks (e.g., WANs) as appropriate, couple various networks with each other and with endpoints 22 and IS 20. In particular embodiments, segments may include gateways for facilitating communication between various networks, such as an LMR gateway between radio network 24a and IP network 24e.

In some cases, users of endpoints of one of communication networks 24a-24e may communicate with endpoints of another of communication networks 24a-24e through facilitation provided by IS 20. A radio network, such as radio network 24a or 24d, may support communication among portable mobile station endpoints, such as land mobile radios (LMRs), using any suitable communication methods or features, such as cellular and push-to-talk (PTT). Communication networks 24a-24e may comprise networks of particular groups or agencies (e.g., a municipality's police department network or a company's network), whether operational with respect to a particular area or otherwise.

IS 20 enables, facilitates and/or provides for interoperable communication among communication endpoints and devices, such as LMRs, cellular phones, IP phones, PCs, PDAs, PSTN phones, video monitors, cameras and sensors of one or more communication networks (e.g., communication networks 24a-24e) using Internet Protocol. Such endpoints may comprise IP or non-IP-enabled endpoints. In particular embodiments, IS 20 may control gateways (for example, of segments 30) in order to map radio frequencies of particular mobile radio endpoints to IP addresses for communication to other types of radio endpoints or IP devices. For example, a particular gateway may be able to receive communications from various types of endpoints (e.g., on various types of communication networks) and may convert such communications for transmission to other types of endpoints. IS 20's control of the gateway may control the various endpoints and/or networks that receive particular communications, depending on system functionality and configuration as further discussed below. As indicated, such control may include the mapping of communications and endpoints to IP addresses for interoperable communication. In some embodiments, IS 20 may host audio conferences that bridge communications received from endpoints. As indicated above, communication system 10 (including IS 20) may include any suitable number or type of gateways (e.g., LMR and PSTN gateways), servers (e.g., multipoint conference servers), switches, routers, firewalls, access points, processors, memory or other hardware, software or encoded logic to provide functionality described herein. IS 20 is coupled to communication networks 24a-24d and endpoints 22 through IP network 24e, which may comprise any suitable IP network.

As indicated above, IS 20 uses IP to enable communication among endpoints of various networks. The manner in which IS 20 facilitates communications among endpoints may vary according to location and system or operational needs. For example, IS 20 may communicate with endpoints using multicast IP addresses assigned to an endpoint of a communication network, a group of endpoints of a communication network or one or more endpoints of multiple communication networks or alternatively using a peer to peer dialed connection or a nailed dialed connection. A group of endpoints may be combined into a virtual talk group for communication using a particular IP address. As an example, the virtual talk group may be assigned a multicast IP address through which users of various embodiments may communicate on the talk group. The use of multicast IP addresses allows IS 20 to facilitate communications among communication devices and endpoints of various communication networks to provide audio, data, video and control network interoperability. As an additional example, in some cases multicast streams (e.g., utilizing multicast IP addresses) may be used. In some cases nailed dialed connections, such as those using SIP protocol, may be used for communication among endpoints and with IS 20. Various embodiments may combine communication methods to facilitate communication among endpoints. For example, in some cases certain endpoints of a virtual talk group may participate in the talk group through a multicast IP address while other endpoints may utilize a nailed SIP connection. IS 20 may control this participation, such as by controlling gateways, multipoint conferences and the mapping of communications to IP addresses.

IS 20 may be utilized and implemented in any number of market segments, such as enterprise safety and security (e.g., loss prevention), transportation, retail, public safety and federal agencies in order to provide radio and non-radio network interoperability within and between such market segments. As indicated above, such network interoperability includes the interoperability of push-to-talk voice technology within various networks and the interoperability between push-to-talk and full duplex dialed connections.

It will be recognized by those of ordinary skill in the art that endpoints 22 and IS 20 may be any combination of hardware, software, and/or encoded logic that provides communication services to a user. In the illustrated embodiment, endpoints 22 comprise a PC (endpoint 22a), a PDA (endpoint 22b) and an IP phone 22c). However, in other embodiments, endpoints 22 may include a telephone, a personal computer (PC), a video monitor, a camera, an IP phone, a cell phone, a land mobile radio (LMR), a personal digital assistant (PDA), a command center or any other communication hardware, software and/or encoded logic that supports the communication of audio, video or other data, using packets of media (or frames) or otherwise, through communication system 10. Endpoints 22 as well as endpoints and components of communication networks 24 may be capable of communicating using any particular type of technology, such as cellular, IP, PSTN, CDMA, GSM, TDMA and satellite. Endpoints 22 and IS 20 may also include unattended or automated systems, gateways, other intermediate components or other devices that can establish media sessions.

Although the illustrated embodiment includes five communication networks 24a-24e, the term "communication network" should be interpreted as generally defining any network capable of transmitting audio and/or video telecommunication signals, data, and/or messages, including signals, data or messages. Any one of networks 24a-24e may be implemented as a local area network (LAN), wide area network (WAN), cellular network, global distributed network such as the Internet, Intranet, Extranet, PSTN, LMR network, CDMA network, GSM network, TDMA network, satellite network or any other form of wireless or wireline communication network.

Communications over communication networks 24a-24e may use any suitable communication protocol. In a particular embodiment, some communication networks may employ voice communication protocols that allow for the addressing or identification of endpoints, nodes, and/or other components coupled to the communication network. For example, using Internet protocol (IP), each of the components coupled together by, for example, communication network 24b in communication system 10 may be identified in information directed using IP addresses. In this manner, network 24b may support any form and/or combination of point-to-point, multicast, unicast, or other techniques for exchanging media packets among components in communication system 10. Any network components capable of exchanging audio, video, or other data are included within the scope of the present invention.

Since IP networks share a common method of transmitting data, telecommunication signals may be transmitted between telephony devices located on different, but interconnected, IP networks. In addition to being coupled to other IP networks, communication network 24b may also be coupled to non-IP telecommunication networks, for example through the use of interfaces or components, including gateways. In the illustrated embodiment, communication network 24b may be coupled with PSTN 24c through a gateway. In some embodiments the gateway may be a part of IS 20 or network 24e. PSTN 24c includes switching stations, central offices, mobile telephone switching offices, pager switching offices, remote terminals, and other related telecommunications equipment that are located throughout the world. IP networks transmit data (including voice and video data) by placing the data in packets and sending each packet individually to the selected destination, along one or more communication paths. Unlike a circuit-switched network (like PSTN 24c), a dedicated circuit is not required for the duration of a call or fax transmission over IP networks.

Technology that allows telecommunications to be transmitted over an IP network may comprise Voice over IP (VoIP), or simply Voice over Packet (VoP). In the illustrated embodiment, one or more of endpoints 22, and endpoints and components of communication networks 24 may be IP telephony devices capable of participating in IM, video, and other multimedia communication sessions. IP telephony devices have the ability of encapsulating a user's voice (or other input) into IP packets so that the voice can be transmitted over a communication network. IP telephony devices may include telephones, fax machines, computers running telephony software, nodes, gateways, wired or wireless devices, hand held PDAs, or any other device capable of performing telephony functions over an IP network.

In particular embodiments, communication system 10 may receive and transmit data in a session initiation protocol (SIP) environment. SIP is an application-layer control protocol that includes primitives for establishing, modifying and terminating communication sessions. SIP works independently of underlying transport protocols and without dependency on the type of session that is being established. SIP also transparently supports name mapping and redirection services, which support personal mobility.

Although FIG. 1 illustrates a particular number and configuration of endpoints, IS and communication networks, communication system 10 contemplates any number or arrangement of such components for communicating media.

Figure 2:
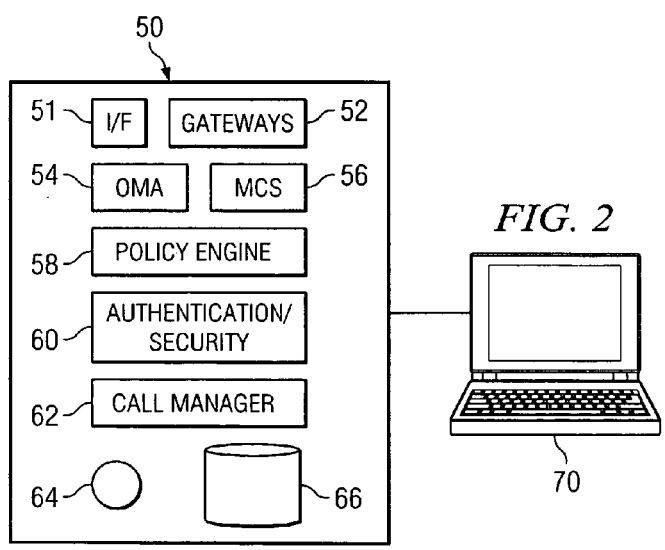
FIG. 2 illustrates an example interoperability system, in accordance with a particular embodiment.

FIG. 2 illustrates interoperability system (IS) 50, in accordance with a particular embodiment. IS 50 may be similar to and provide the same functionality as IS 20 of FIG. 1. In the illustrated embodiment, IS 50 includes interface 51, gateways 52, operations management application (OMA) 54, multipoint conference system (MCS) 56, policy engine 58, authentication and security system 60, call manager 62, processor 64 and memory module 66. IS 50 is coupled to a PC endpoint 70 that may be used to access, configure and control various functionality provided by IS 50. PC endpoint 70 may run a client application for such access, configuration and control. The client application may enable a user of endpoint 70 to receive and monitor communications from various endpoints and virtual talk groups. In particular embodiments, other types of endpoints may be utilized to access, configure and control IS 50, such as IP phones, PDAs and mobile devices. IS 50 may be coupled to such endpoints (including PC endpoint 70) through one or more communication networks.

Interface 51 is used in the communication of audio, video, signaling and other data between IS 50 and other network components. For example, interface 51 may receive communications from endpoints such as endpoints of communication networks 24, endpoints 22 and endpoint 70. The communication may take place over IP networks thereby negating the need for dedicated wiring between the endpoints and the IS.

Gateways 52 may include any suitable gateways to provide network interoperability and back-end legacy application integration, such as LMR gateways, PSTN gateways and application gateways. Gateways 52 provide mapping between IP services and the interoperable networks, such as LMR network 24a of FIG. 1. In some cases gateways 52 may not be located within an IS but may be distributed throughout a communication system for enabling communications among various communication networks.

Operations management application (OMA) 54 includes functionality for configuration, management and control of IS 50, including conference and collaboration management, and may be accessed by a user via, for example, PC endpoint 70. In particular embodiments, OMA 54 may enable a user, such as dispatch personnel or administrators or a mobile user (e.g., a first responder mobile user) accessing IS 50 via a mobile endpoint, the ability to configure, manage and participate in one or more virtual talk groups and ad hoc conferences simultaneously. In particular embodiments, OMA 54 may be accessed through a web interface, functioning for example as a soft phone for radios. A screen display may be controlled using a mouse, keypad, touch screen, voice commands or any other suitable interface. OMA 54 screens may include any number of functional controls to provide interoperable communications. OMA 54 may authenticate a user and obtain user configuration information upon a user accessing the OMA. OMA 54 may monitor and provide communication ability for any number of channels at one time to provide the ability for an OMA user to communicate on and control multiple virtual talk groups at once.

Multipoint conference system (MCS) 56 provides collaboration and conference services for multiple endpoints of one or more networks. For example, users of multiple endpoints (such as LMRs of different networks (e.g., networks of different agencies or groups) and different types of endpoints of different networks) may be bridged together through MCS 56 to provide virtual talk group communications. MCS 56 may include any suitable number or type of conference bridges, ports, digital signal processors or other components to facilitate communications discussed herein.

Policy engine 58 includes policies for undertaking various operations and functionality upon the occurrence of various events to provide dynamic incident management. These policies may include both pre-determined and ad hoc policies. For example, upon the occurrence of a particular incident, the incident may include a unique identifier and may have basic incident attributes such as time of creation, name of user creating and status. A pre-determined policy may then be executed by an incident manager or dispatch personnel as action for the specific incident. In particular embodiments, policy engine may receive inputs from alarms and sensors to setup device agnostic communications interoperability and one-way video and data collaboration and to trigger additional events such as pagers, e-mails, notifications, dial-outs, recording and information escalation.

Authentication and security system 60 manages access, configuration and control privileges for users of IS 50 and those participating in interoperable communications. For example, different users may have different privileges assigned for interoperable communications. Some users may only have transmit or listen privileges with respect to one or more particular talk groups, while other users may have the ability to communicate in all talk groups or setup and configure various talk groups. User privileges may change dynamically upon the occurrence of particular events.

Call manager 62 maintains information regarding various users, such as users of IP networks for which interoperable communications are provided by IS 50. This facilitates in the extension of PTT to IP networks and in the provision of voice and data interoperability across radio and non-radio networks. In particular embodiments, call manager 62 may maintain a listing, table, or other organization of information about users. The information may include a name or other identifier and contact information such as phone numbers and email addresses for the users. In particular embodiments call manager 62 may represent any appropriate combination of hardware, software and/or encoded logic distributed throughout a communication network coupled with IS.

Processor 64 may be a microprocessor, controller, or any other suitable computing device, resource, or combination of hardware, software and/or encoded logic operable to provide, either alone or in conjunction with other IS components such as OMA 54, IS 50 functionality. Such functionality may include providing various features discussed herein to a user, such as a user of an endpoint accessing IS 50 through OMA 54. Such features may include providing to the user endpoint location information of communicating endpoints of a plurality of monitored endpoints and/or virtual talk groups, enabling the user to listen to and/or participate in communications involving endpoints and/or virtual talk groups of a particular geographic area, presenting communications of endpoints of scene-related virtual talk groups according to preconfigured or received instructions and controlling various gateways and other network components to facilitate interoperable communications among various endpoints.

Memory module 66 may be any form of volatile or non-volatile memory including, without limitation, magnetic media, optical media, random access memory (RAM), read-only memory (ROM), removable media, or any other suitable local or remote memory component. Memory module 66 may store any suitable data or information, including software and encoded logic, utilized by IS 50. In particular embodiments, memory module 66 may include data for user management, talk-group management, resource pool management, privileges, backup configuration and information and/or timestamp and activity tracking.

IS 50 may also include any number of switches, routers, firewalls, mobile access routers, access points, wireless bridges and other components in order to accommodate particular operational desires and needs.

In particular embodiments such as in the LMR network interoperability context, IS 50 may, through one or more components discussed above or through other components, encode received audio with a standard audio codec, such as G.711 or G.729. Those audio samples may be packaged in standards-based real-time transport protocol (RTP) packets suitable for transport on an IP network. At this point, the communication element may be abstracted from the distinctive characteristics of each radio system. These audio packets can be sent across the network to other radio systems either individually (unicast) or as a group (multicast). The recipient of the audio packets may be a device capable of receiving and decoding the RTP stream, such as an IP telephone or PC with appropriate software. The IP network and IP-enabled devices can be used to allow users to monitor or transmit on a particular radio channel from a desk without issuing another radio.

As indicated above, IS 50 may facilitate communication among users of endpoints of various networks through virtual channels or talk groups. For example, a channel may comprise a unidirectional or bidirectional path for transmitting and/or receiving electrical or electromagnetic signals. This may comprise, for example, a conventional radio physical RF channel. A talk group in this context may be a subgroup of users (e.g., radio users) who share a common functional responsibility and typically coordinate actions amongst themselves without radio interface with other subgroups. For example, a municipality's police department network may include various talk groups of various users.

A virtual talk group (VTG) represents interoperability of a group of channels, for example, as an audio conference or meeting. A virtual talk group may include an associated virtual channel and an ID. Virtual channels may comprise an address, such as an IP address, associated with a virtual talk group through which users may access the virtual talk group and/or through which communications from VTG member-endpoints are bridged. Various types of virtual talk groups may be utilized in particular embodiments, such as a multicast address usable by all endpoints of the VTG, a VTG comprising multiple talk groups (e.g., multiple radio sources from different frequencies whose communications are mixed), a unicast group and a combination unicast and multicast group.

As an example, a particular virtual talk group may comprise a conference or meeting of the following: (1) a channel or other multicast path used by certain users of a police department's radio network, (2) a channel or other multicast path used by certain users of a fire department's radio network, (3) a channel or other multicast path used by certain users of a corporation's security radio network and (4) a plurality of users of IP-enabled endpoints such as IP phones, IP-enabled PDAs or PCs. An operator of IS 50 may configure the virtual talk group using any suitable interface, such as by dragging and dropping the included channels and IP endpoints into a single area representing the virtual talk group. MCS 56 may provide the functionality for the conference of the virtual talk group members. In particular embodiments, multiple talk groups may be patched together on a dynamic, as needed basis. In some cases a virtual talk group may not necessarily include communications through an IS but may instead include member endpoints whose communications are mapped to IP addresses at gateways (such as LMR gateways) controlled by an IS.

Any number of virtual talk groups may be configured to provide any suitable audio, data, video and control network interoperability. Virtual talk groups may be created using any suitable user/endpoint groups or channels based on location, organizational requirements, event requirements or any other suitable characteristic. An administrator or operator may configure channel details such as name, description, participants, multicast IP addresses, codec and latch options through, for example, OMA 54.

FIG. 3 illustrates a system for providing a push-to-talk communication session, in accordance with a particular embodiment. The illustrated embodiment includes a full duplex endpoint 80 and a plurality of half-duplex endpoints 90 coupled to an IS 100. It should be understood that FIG. 3 is only a logical illustration, and endpoints 80 and 90 may be coupled to IS 100 through any number of communication networks, such as an IP network. For example, IS 100 may act as a node coupled to an IP network as illustrated with respect to IS 20 of FIG. 1. In some cases, communications between endpoints 80 and 90 may not travel through IS 100 but may travel through gateways and other network components controlled by an IS. In particular embodiments, endpoints 80 and 90a-90c may comprise endpoints of different communication networks or communicating on different frequencies, such as endpoints of different police departments, fire departments or other security agencies or groups, including various users of a private organization or company. Endpoints 80 and 90a-90c may typically communicate on their own communication networks or on separate frequencies. In this case communications between endpoints 80 and 90a-90c are facilitated by IS 100 (e.g., bridged through IS 100 in some cases) for interoperable communication with each other in a virtual talk group using Internet Protocol as generally described above with respect to FIGS. 1 and 2.

In the illustrated embodiment, endpoints 90a and 90b are part of communication network 95a, and endpoint 90c is a part of communication network 95b. Communication networks 95a and 95b may comprise, for example, land mobile radio networks of different agencies or groups. It should be understood that endpoints 80 and 90 may communicate with IS 100 through any of a variety of communication networks, such as one or more WANs, LANs, cellular networks, PSTNs, LMR networks, CDMA networks, GSM networks, TDMA networks or satellite networks. IS 100 may be similar to, and may provide similar functionality as, IS 50 discussed above. IS 100 may include the same or similar components as IS 50 and may also include a PTT floor control proxy system comprising any suitable processor or hardware, software or encoded logic to provide the functionality described herein.

Endpoint 80 may comprise a PSTN phone, cell phone or other suitable full duplex endpoint and may include various functionality provided by endpoint 70 described above, such as the ability to access, configure and control various functionality provided by an IS and the ability to run a client application for such access, configuration and control. In the illustrated embodiment, endpoint 80 includes a transmitter/receiver 82, a user interface 84, a processor 86 and a memory module 88. Transmitter/receiver 82 transmits and receives communications such as audio, video, instant messaging and other data to and from other network components. User interface 84 provides a mechanism through which a user of endpoint 80 may operate the endpoint and communicate with other network devices. Interface 84 may comprise, for example, a microphone, a speaker, a keypad (e.g., for transmitting DTMF signals) or any other suitable interface. Instructions may be submitted through speech recognition, collection of keystrokes, soft key or otherwise.

Processor 86 may be a microprocessor, controller, or any other suitable computing device, resource, or combination of hardware, software and/or encoded logic operable to perform endpoint functionality. Processor 86, either alone or in conjunction with other endpoint components, provides endpoint functionality discussed herein. Memory module 88 may be any form of volatile or non-volatile memory including, without limitation, magnetic media, optical media, random access memory (RAM), read-only memory (ROM), removable media, or any other suitable local or remote memory component.

Endpoint 80 comprises an endpoint capable of communicating in a full duplex manner, such as a cellular phone. Thus, endpoint 80 may receive and transmit communications at the same time using, for example, separate communication channels for incoming and outgoing communications. Endpoints 90 comprise any suitable half-duplex devices, such as push-to-talk land mobile radios. Thus, endpoints 90 may only either transmit or receive communications at one time, as one communication channel is used for incoming and outgoing communications. As indicated above, particular embodiments provide a user of a full duplex endpoint, such as endpoint 80, with the ability to communicate through PTT technology with one or more users of half-duplex endpoints, such as endpoints 90.

As an example, a user of a full duplex endpoint, such as endpoint 80, calls into IS 100 in order to participate in a virtual talk group of users of half-duplex, push-to-talk land mobile radios, such as endpoints 90. A multipoint conference system of the IS may bridge together transmissions from an endpoint 80 or 90 for communication to the other endpoints in the conference VTG, or IS 100 may otherwise facilitate communications among the endpoints. Since endpoint 80 is part of a conference of half-duplex endpoints, it must "control the floor" in order to have its communications transmitted to and received by the other, half-duplex endpoints of the conference. Otherwise, its outgoing communications may not reach a half duplex endpoint 90 that is currently sending a communication of its own and vice versa, since half duplex endpoints 90 communicate through a single channel. This floor control may be provided to endpoint 80 by IS 50 through a mute function. For example, when endpoint 80 is not muted, it controls the floor such that its communications are transmitted to PTT endpoints 90 of the VTG. IS 100 will prevent users of half duplex endpoints 90 from gaining control of the floor at this time. However, when endpoint 80 is muted, then one of PTT endpoints 90 may be able to control the floor to communicate to the rest of the VTG, including to endpoint 80. The mute function may be activated and deactivated by the user of endpoint 80 through any suitable method, such as through a DTMF button of the endpoint which transmits a DTMF signal in the communication channel through which endpoint 80 communicates with IS 50. In some embodiments, IS 50 may force full duplex endpoint 80 into mute whenever a half duplex endpoint gains floor control.

When endpoint 80 calls into a VTG comprising one or more half-duplex devices (e.g., endpoints 90), IS 100 may automatically mute the endpoint and may notify its user that the endpoint is on mute. When IS 100 mutes endpoint 80, it may prevent its communications, such as its RTP packet stream in particular embodiments, from reaching the other endpoints of the VTG. IS 100 may provide the user of endpoint 80 with the instructions of how to un-mute (e.g., pressing DTMF button 1 on his endpoint) and how to mute (e.g., pressing DTMF button 0 on his endpoint). In some cases, the same DTMF button may be used to mute and un-mute the endpoint.

When the user of endpoint 80 desires to "control the floor" in order to communicate with the half-duplex endpoints 90 of the VTG, the user may un-mute the endpoint. Upon receiving the command to un-mute (e.g., through a DTMF signal), IS 100 transmits a typical floor control signal to the other, half-duplex endpoints 90 such that they are not allowed to communicate in the VTG. This is similar to the manner in which a typical PTT endpoint prevents other PTT endpoints communicating on a channel from communicating when the first PTT endpoint controls the floor. After making his desired communications, the user of endpoint 80 may subsequently mute the endpoint in order to allow another endpoint to control the floor and communicate on the VTG.

In particular embodiments, IS 100 may utilize the fact that endpoint 80 is connected via a full duplex connection (e.g., another communication channel will be available to communication with endpoint 80) and may provide an audible signal to the user of endpoint 80 in order to give him feedback that endpoint 80 is unmuted and thus has the floor. This may be similar to the typical PTT context whereby when a user of a PTT, half-duplex endpoint presses his "talk" button, he receives an audible signal when he has floor control allowing his communications to be received by the other PTT endpoints communicating on the same channel. The audio signal may comprise, for example, a "boink" sound signifying the granting of floor control by IS 100 to endpoint 80.

In particular embodiments, IS 100 may utilize other methods to signal to a user of endpoint 80 that endpoint 80 has control of the floor. In some cases, IS 100 may transmit a visual indicator (e.g., LED, instant message, e-mail, flash display, etc.) to endpoint 80 to signify floor control. In some embodiments, IS 100 may provide floor control confirmation to endpoint 80 through vibrations. In other embodiments a user of endpoint 80 may have another, associated endpoint to which a floor control confirmation signal may be transmitted, whether audio, visual or otherwise. For example, endpoint 80 may comprise a full duplex telephone and the user of endpoint 80 may also have another endpoint, such as a PC, coupled to IS 100. IS 100 may transmit a floor control confirmation signal to the PC endpoint. This confirmation signal could be in any suitable form, such as an instant message, e-mail or otherwise.

If a user of endpoint 80 attempts to gain floor control (e.g., through a DTMF signal) when another endpoint such as one of PTT endpoints 90 has the floor, IS 100 may transmit a floor control denial signal to endpoint 80 or another endpoint associated with the user of endpoint 80 to notify the user that he cannot gain control of the floor at that time. In particular embodiments, such floor control denial signal may comprise an audio "bonk" transmitted to endpoint 80. In other embodiments, such floor control denial signal may comprise another audio signal or a visual or vibratory signal transmitted to endpoint 80 or another endpoint associated with the user of endpoint 80 and coupled to IS 100, such as those described above with respect to the floor control confirmation signal.

In some embodiments, IS 100 may attempt to prevent a user of full-duplex endpoint 80 from controlling the floor for an extended amount of time (e.g., "locking the channel") since, while the user controls the floor, he has the channel locked such that other PTT endpoints are prevented from communicating in the VTG. For example, if IS 100 determines that a user is talking longer than a particular amount of time (e.g., 2 minutes), the system may utilize the full duplex capability of the communication channel to endpoint 80 to signal the user that he is about to be muted. In some cases, the user may not be talking and may have forgotten that endpoint 80 was un-muted such that he had control of the floor preventing endpoints 90 from communicating. Such a signal may take the form of an audible tone or other signal, such as a whisper indication. In some cases, IS 100 may not signal the user of endpoint 80 that he is about to be muted and may automatically mute the endpoint when a maximum talk time is reached.

In some embodiments, IS 100 may have a policy that determines the maximum amount of time that a particular user may control the floor (e.g., a maximum talk time). This maximum talk time may vary by user. For example, higher priority users (e.g., higher ranked users or users in higher positions within an organization) may be allotted a longer maximum talk time. In some cases, a maximum talk time for a user communicating on a full duplex endpoint in a VTG with users of half-duplex devices may vary based on a type or priority of an event associated with the VTG. For example, higher priority events or events of a particular type (e.g., a terrorist event) may allow a shorter or longer maximum talk time while lower priority events or events of another type (e.g., a car accident) may allow a different maximum talk time.

As described above, IS 100 enables a user of full duplex endpoint 80 to participate in PTT communications with, for example, PTT endpoints even though full duplex endpoint 80 may not understand or otherwise be capable of such participation.

FIG. 4A illustrates a system for providing a push-to-talk communication session using a control endpoint, in accordance with a particular embodiment. The illustrated embodiment includes a full duplex endpoint 120, a control endpoint 122 and a plurality of half-duplex endpoints 130 coupled to an IS 140. Similar to FIG. 3, FIG. 4A is only a logical illustration, and endpoints 120, 122 and 130 may be coupled to IS 140 through any of a number of communication networks, such as an IP network. In some cases, communications between the illustrated endpoints may not travel through IS 140 but may travel through gateways and other network components controlled by an IS. While not specifically illustrated, endpoints 120, 122 and 130 may be coupled to IS 140 through one or more separate communication networks, such as land mobile radio networks of separate groups or supporting communication on separate frequencies, as discussed above with respect to endpoints 80 and 90 of FIG. 3. Communication paths from endpoints 120 and 122 may traverse different networks. For example, a communication path from endpoint 120 may traverse a PSTN network, and a communication path from endpoint 122 may traverse a WAN.

In particular embodiments, endpoints 120, 122 and 130 may comprise endpoints of different communication networks, such as endpoints of different police departments, fire departments or other security agencies or groups. Endpoints 120 and 130 (including endpoints 130*a*-130*c* individually) may typically communicate on their own communication networks on frequencies; but in this case their communications are bridged through IS 140 for interoperable communication with each other in a virtual talk group using Internet Protocol. IS 140 may be similar to, and may provide similar functionality as, IS 50 discussed above.

Full duplex endpoint 120 and control endpoint 122 may each comprise any suitable transmitter/receiver, user interface, processor and memory module. In some cases, full duplex endpoint 120 may comprise a rotary phone incapable of transmitting DTMF or other control signals to IS 140.

In the illustrated embodiment, two different communication paths or channels are used to provide full duplex endpoint 120 with the ability to effectively communicate with half-duplex endpoints 130. One communication path or channel may be used as a data channel to communicate the audio information, while another communication path or channel may be used as a control channel to communicate PTT controls. Particular embodiments may terminate the data and control paths at the same, full duplex endpoint such as endpoint 120. However, as illustrated, in some embodiments the data path and the control path may terminate at different devices or endpoints. For example, a data communication path from endpoint 120 carries the audio that the user of endpoint 120 requests to communicate to the users of endpoints 130 in the VTG. A control communication path from endpoint 122 carries the PTT floor control signal used by the user of control endpoint 122 to speak on the VTG. This control signal may be transmitted by the user through control endpoint 122, which is separate from endpoint 120 used by the user to talk on the VTG. In some cases, the user may authenticate himself at endpoint 122. This authentication will associate his use of endpoint 122 with his audio transmissions from endpoint 120 to allow the user to communicate in a PTT manner on endpoint 120 using endpoint 122 as a floor control device.

The illustrated embodiment utilizes a signaling method for controlling the PTT and floor control on behalf of full duplex endpoint 120. Control endpoint 122 may be used to implement a self-moderated PTT control and may include a separate PTT button 121 to control the floor through the control path. Control endpoint 122 may comprise any of a number of types of endpoints, such as a PC, a PDA or an IP phone and may interface with IS 140 to control the floor on PTT communications of full duplex 120 using any suitable interface, such as a web interface. For example, a separate button's floor control functionality may be implemented through HTTP or XML in some cases. In some cases, floor control may be provided through a PTT soft button on, for example, a PDA or through a hardware device such as a foot switch. In some cases, floor control may be provided via instant messaging between a user and an IS. A user of endpoint 120 may be in a PTT VTG (provided through or facilitated by IS 140) with half-duplex endpoints 130. Endpoint 122 includes PTT button 121 used by the user when the user wishes to gain floor control in order to communicate to the group. When the user desires to talk, he may press and hold PTT button 121. A floor control request signal is then sent to IS 140 which then sends a signal to half duplex endpoints 130 indicating that endpoint 120 has the floor to talk. IS 140 may also send a floor control confirmation signal (e.g., audio, video, vibratory or otherwise) to endpoint 120, endpoint 122 or both to notify the user that he has control of the floor. The user may then talk through endpoint 120, and the user's audio may be communicated from endpoint 120 (e.g., through IS 140 or otherwise) for transmittal to endpoints 130 of the VTG. Similarly, if another endpoint has control of the floor when the user sends the floor control signal via endpoint 122, then IS 140 may transmit a floor control denial signal to endpoint 120, endpoint 122 or both to notify the user that he cannot gain control of the floor at that time. A user may also control other PTT functionality through control endpoint 122, such as activation, deactivation, configuration functions, mute and un-mute.

It should be understood that particular embodiments may vary in the manner in which a user controls the floor through control endpoint 122. For example, in some cases the user may press button 121 to take control of the floor and then press it again to relinquish floor control. In some cases multiple buttons may be used. Some embodiments may not use a button but may instead use another type of interface, such as a touch screen display of control endpoint 122. Particular embodiments contemplate great flexibility in the manner in which the PTT control signal is activated or used to control the floor to enable the user of endpoint 120 to communicate in the VTG in a PTT manner with endpoints 130. Using a separate endpoint as the source for the PTT control signal provides particular advantages, including the ability to utilize a full duplex endpoint that does not have DTMF capability (e.g., an older rotary phone) in the PTT environment provided for full duplex endpoints through an IS.

In some embodiments that utilize separate channels for data and control, such separate channels may terminate at the same endpoint. For example, in some cases both the data path and control signal path may terminate at endpoint 120, and endpoint 120 may include PTT button 121 or other suitable interface for floor control. This is similar to the embodiments discussed with respect to FIG. 3 in which endpoint 80 was used both for the audio communications and to gain control of the floor to speak. However, as discussed above, in embodiments described with respect to FIG. 4A the control signal is communicated in a different path (i.e., a control path) than the main talk or audio stream; and in FIG. 3 the control signal was communicated in the main talk or data stream (e.g., through DTMF signaling in that stream).

FIG. 4B illustrates another example of the use of a separate path or channel for the control signaling used by a plurality of users of a full duplex endpoint to communicate in a PTT virtual talk group. In the illustrated embodiment, full duplex endpoint 120 may be a phone in a conference room or another endpoint usable by multiple users to participate in a PTT VTG with half duplex endpoints 130. Control endpoints 126 are coupled to IS 140 and are used by each user individually to provide PTT floor control for the users. Control endpoints 126 may comprise any suitable device for communicating a PTT control signal to IS 140, such as a cell phone (endpoint 126a), a PC (endpoint 126b) or a PDA (endpoint 126c). As described above with respect to endpoints of other embodiments, full duplex endpoint 120, endpoints 126 and half duplex endpoints 130 may be coupled to IS 140 through one or more communication networks, such as one or more WANs, LANs, cellular networks, PSTNs, LMR networks, CDMA networks, GSM networks, TDMA networks or satellite networks.

As an example in operation, endpoint 120 may be a full duplex conference phone in a conference room and may be used to provide communications in a VTG through IS 140 with PTT endpoints 130. Control endpoints 126a-126c may each comprise an endpoint of a respective person in the conference room. Each such person uses endpoint 120 to talk on the VTG conference. Conference communications may be transmitted from endpoint 120 for communication to endpoints 130. However, each such person may use his respective endpoint 126 to control the floor of the conference when he desires to talk. Such PTT floor control signals are transmitted to IS 140 from the respective endpoint 126 along a control path (e.g., in a similar manner as discussed above with respect to FIG. 4A). For example, when a user of cell phone endpoint 126a desires to talk on the conference, he may press and hold a PTT button on his cell phone. This sends a floor control signal to IS 140 which is transmitted to endpoints 130 to indicate that a user of endpoint 120 has the floor. The cell phone user then speaks or otherwise communicates on the conference through endpoint 120. The conference communications are communicated to IS 140 along a data path from endpoint 120. Similarly, when a user of PDA 126c desires to communicate on the VTG conference, he may gain control of the floor by a control signal transmitted from endpoint 126c along a control between endpoint 126c and IS 140. The user may then talk on the conference through endpoint 120. As is the case with other embodiments, any number of interfaces or floor control activation methods may be used, including web interfaces through endpoints 126. In some embodiments, the control signals may be transmitted from endpoints 126 to endpoint 120 for communication to IS 140. In this way, they may be transmitted from endpoint 120 to IS 140 along a control path separate from the data path from endpoint 120.

In some cases, IS 140 may determine and identify a particular speaker based on the endpoint from which the PTT control signal is transmitted. For example, when communication is made from endpoint 120 after a user gains floor control using his cell phone endpoint 126a, IS 140 may determine that the person speaking is the user associated with endpoint 126a. This may be useful to other users of IS 140 in determining the identity of a particular speaker out of a plurality of people in a conference room all using a full duplex conference room phone such as endpoint 120 for their VTG communications.

Figure 5:
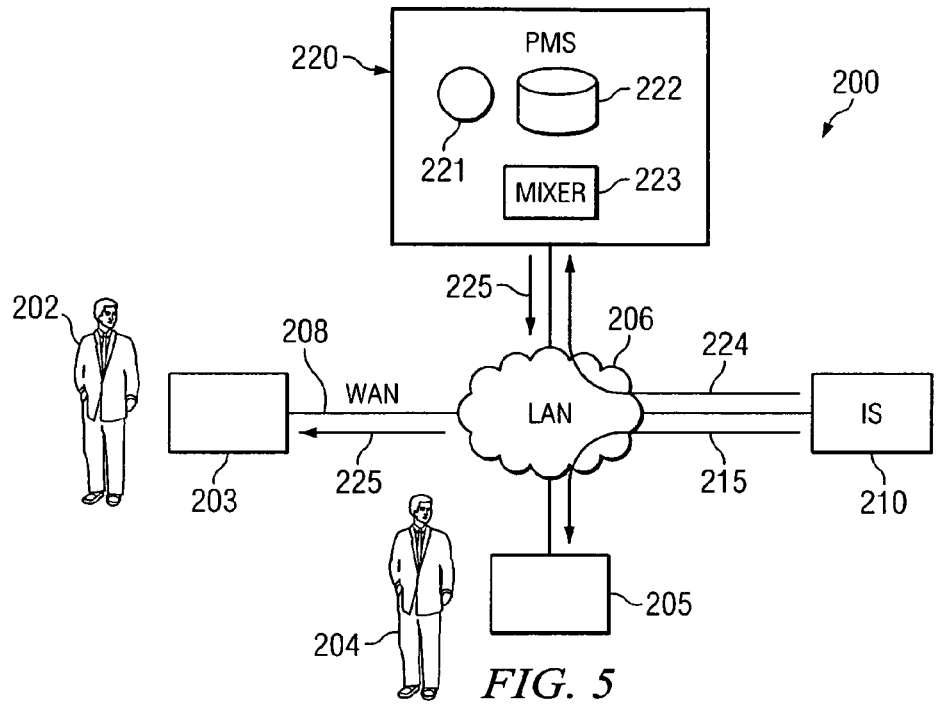
FIG. 5 illustrates an example system for providing a push-to-talk proxy media service, in accordance with a particular embodiment.

FIG. 5 illustrates a system 200 for providing a proxy media service, in accordance with a particular embodiment. System 200 includes users 202 and 204 who monitor push-to-talk communications of VTGs provided by IS 210. IS 210 may be similar to IS 50 described above and may enable interoperable VTG communications among endpoints of different communication networks. In particular cases, users 202 and 204 may desire to monitor at one time, through IS 210, communications from a plurality of different VTGs supported by the IS, each VTG comprising a conference media stream of PTT communications of respective endpoints of the VTG. In some cases, such users may monitor communications from eight separate PTT VTG groups and may therefore receive eight separate media streams.

User 204 may access IS 210 through endpoint 205, which may comprise any suitable endpoint for receiving multiple streams of PTT communications for monitoring, such as a PC endpoint accessing the OMA of IS 210 and running a PC media client of the IS. Endpoint 205 is coupled to IS 210 through a high bandwidth network 206, in this case a LAN. IS 210 may transmit a communication stream for each of the plurality of monitored VTGs, collectively communication streams 215, to endpoint 205 via high bandwidth network 206. As indicated above, in some cases communication streams 215 may comprise up to eight different media streams each from a monitored channel of PTT VTG communications. Endpoint 205 may then mix each of the communications streams 215 for communication to user 204 through a speaker or otherwise. In some cases, user 204 may use endpoint 205 for changing the volume of one or more of the streams 215 with respect to another of the streams or for providing other control functionality.

In some situations, a user's access to IS 210 may be provided through a low bandwidth network that is only able to effectively communicate audio from one PTT VTG channel at one time. Thus, the low bandwidth network is not able to effectively communicate the plurality of monitored PTT VTG communications in a separate stream for each VTG (e.g., in some cases this may include eight streams) as can be done for endpoint 205 accessing the IS through a LAN's high bandwidth connection. For example, a user may be accessing IS 210 via a low bandwidth WAN, such as through a DSL connection from home or away from a LAN at an office to which the IS is coupled. In particular embodiments a proxy media service may be used to mix the monitored streams into one stream for effective communication to the user through the WAN. Likewise, the proxy media service may also receive communications from the user over the WAN for communication over one or more of the monitored streams (or VTGs). The proxy media service may also utilize a control path over the WAN to provide control functionality to the user as desired. Examples of this control functionality are further discussed below. Therefore, particular embodiments provide a user connected over a low bandwidth WAN similar functionality and services for monitoring, communicating and with controlling a plurality of PTT VTGs as that provided to a user connected through a high bandwidth LAN.

As an example in operation, user 202, utilizing endpoint 203, accesses IS 210 through low-bandwidth WAN 208. Endpoint 203 may comprise any suitable endpoint accessing the OMA of IS 210 and running a PC media client of the IS. In this example, since endpoint 203 is coupled to IS 210 through a low bandwidth network, the individual communication streams from the monitored PTT VTGs are communicated to a proxy media service (PMS) 220. IS 210 may transmit, direct and/or facilitate such communication. For example, IS 210 may instruct PMS 220 to listen to a particular multicast stream to enable PMS 220 to receive the communications on the stream. In some cases the communication streams may be sent from IS 210 to PMS 220. The media streams are collectively illustrated as communication streams 224 and may comprise a plurality of streams, each for a separate monitored PTT VTG channel. In some cases communication streams 224 may include eight streams.

In the illustrated embodiment, PMS 220 includes a processor 221, a database 222 and a mixer 223. Processor 221 may be a microprocessor, controller, or any other suitable computing device, resource, or combination of hardware, software and/or encoded logic operable to provide, either alone or in conjunction with other PMS 220 components such as mixer 223, PMS 220 functionality. Memory module 222 may be any form of volatile or non-volatile memory including, without limitation, magnetic media, optical media, random access memory (RAM), read-only memory (ROM), removable media, or any other suitable local or remote memory component. Memory module 222 may store any suitable data or information, including software and encoded logic, utilized by PMS 220.

Mixer 223, in conjunction with processor 221, mixes the individual communication streams 224 received at PMS 220 into one stream so that the media may be effectively communicated to endpoint 203 via low bandwidth network 208. Mixer 223 may comprise any hardware, software or encoded logic to provide its functionality.

Continuing the example described above, PMS 220 receives communication streams 224 and mixes them into one stream for communication to endpoint 203 of user 202. The mixed stream of the plurality of communication streams 224 is represented as communication stream 225. Communication stream 225 travels to endpoint 203 through low bandwidth network 208 and, as discussed above, includes in one stream communications from each of a plurality of PTT VTGs enabled by IS 210 that user 202 desires to monitor. In some cases, this may include up to 8 separate PTT streams mixed into communication stream 225. In some embodiments, endpoint 203 may be connected to PMS 220 through a nailed connection.

In some embodiments, PMS 220 may also transmit to endpoint 203 an identification of a VTG channel from which a particular communication comes. This may be displayed to user 202 by endpoint 203. This is particular helpful to user 202 since endpoint 203 is receiving a single stream 225 that comprises communications originating from a plurality streams. For example, user 202 may monitor VTGs 1-8 that are enabled by IS 210. A particular communication from, for example, VTG 5 may be mixed into stream 225 and transmitted to endpoint 203. Since user 202 is monitoring 8 different VTGs, he would not otherwise know that the particular communication came from VTG 5 if not notified of this by PMS 220. Thus, PMS 220 may transmit information signifying the channel of VTG 5 as the source of a particular communication sent in communication stream 225.

In addition, endpoint 203 may be able to receive communications on a plurality of channels. User 202 may, through a button of endpoint 203 or otherwise, notify PMS 220 of a particular channel in which to transmit mixed communication stream 225. For example, if the user selects channel B, then PMS 220 may receive communication streams 224 each communicated on a different channel, mix them into one stream 225 and transmit this stream to endpoint 203 on selected channel B.

In particular embodiments, user 202 may utilize a signaling or control channel between the endpoint and PMS 220 for controlling various features of PMS 220. For example, if the user wanted to change the volume of a particular channel in the mixed stream 225, the user may transmit such a request along the control path. In response, mixer 223 and processor 221 may change the volume of the particular VTGs communications relative to the other VTGs when mixing the communications from the various VTGs. The volume change will then be represented in mixed stream 225 communicated to endpoint 203.

A separate control or signaling path may also carry other user selections, such as a selection of a particular VTG channel to mix into stream 225. For example, IS 210 may be providing other VTGs that are not currently mixed into stream 225. User 202 may select one or more other such channels through the control or signaling path and PMS 220, in response, may receive communications from the selected VTG(s) and mix them into stream 225 for communication to endpoint 203. Other control functionality that may be provided through the control path may include activation and deactivation of particular VTG streams (for transmission by PMS 220 and receipt at endpoint 203) and mute and un-mute of particular streams.

In addition, in particular embodiments user 202 may transmit communications to one or more of the VTG streams over the WAN. For example, the user may use endpoint 203 to speak, and such spoken communication may be transmitted to PMS 220 for communication in one or more of the PTT VTGs, through multicast, SIP nailed dialed connection, bridged communication or otherwise facilitated by IS 210. Thus, PMS 220 enables the user to communicate a single stream over the WAN for communication to a plurality of VTG streams instead of the user having to communicate (over the WAN) separate streams for each of the VTGs the user desires to receive the communication.

The user may use the control path to identify a subset of the streams monitored by the PMS 220 to which the user's communications will be transmitted. For example, PMS 220 may be monitoring and mixing 8 VTG streams for transmission to endpoint 203. However, the user at a particular time may only desire to speak on 3 of such streams. Thus, the user may use a PC softkey or other mechanism to identify the three streams to which a particular communication from the user should be transmitted. This identification of the streams to which a particular communication from the user should be transmitted may be undertaken by a selection or other activation of the stream at the user endpoint. Then, when the user speaks, his communication is transmitted in a single stream to PMS 220 which then forks the communication to the identified streams. PMS 220 may transmit to the endpoint through an LED or other notification an identification of the selected streams to which the user's communication is transmitted. Thus, particular embodiments enable the user to provide latch and unlatch speaking functionality over a control path to one or more of the streams monitored at PMS 220. This is advantageous since many services providing internet connections over a WAN, such as many DSL services, provide a lower bandwidth for upstream communications than that provided for downstream communications.

In particular embodiments, a system may, for example through PMS 220, have the ability to continuously analyze the available bandwidth over WAN 208 and the number of communication streams that the user wishes to monitor and/or participate in. Based on this analysis, the system may determine whether to use the mixing capabilities of PMS 220 to mix such streams at the PMS or whether to send or receive the separate streams from endpoint 203. For example, if user 202 desires to receive and/or communicate in 6 separate communication streams facilitated by IS 210 and enough bandwidth exists over WAN 208 to convey each separate stream at an appropriate quality level, then the streams may be individually transmitted to endpoint 203 without mixing at PMS 220 and the user may communicate on the streams by endpoint 203 transmitting separate communications for each stream over WAN 208. If, however, enough bandwidth does not exist over WAN 208 to convey each separate stream at a specified or appropriate quality level, then the streams may be mixed at PMS 220 for transmission as a mixed stream over WAN 208 to endpoint 203 as discussed above. Moreover, as discussed above a single communication stream from the user may be transmitted over WAN 208 (e.g., "upstream") and may be forked at PMS 220 for transmission on the user's specified talk groups or channels. In this case, endpoint 203 may include a processor (e.g., similar to the processor of PMS 220) or other hardware, software or logic component for monitoring the bandwidth over WAN 208 and determining whether to send a user communication in a single stream upstream to PMS 220 for forking at PMS 220 to each of a user-selected number of VTG streams or whether to send separate streams over WAN 208 from the user endpoint for transmission to each of the user-selected number of VTG streams. As indicated above, the determination may be based on whether the transmission of the separate individual streams over WAN 208 can be accomplished at a specified or appropriate quality level. The acceptable service level needed to make the determination over whether to use PMS 220 for mixing/forking may be determined, for example, by a system operator or administrator or otherwise. Call admission control functionality may be used in this process for making such determination.

In some embodiments, user 202 may communicate on the monitored VTGs mixed into stream 225 in a similar manner as discussed above with respect to embodiments providing PTT communication ability to full duplex endpoints. In this case, PMS 220 may analyze and embed specific PTT tones to provide the user appropriate boinks and bonks such that the user experience looks and feels like a native PTT user even though the full duplex device has no knowledge of floor control.

As indicated above, particular embodiments provide a user connected over a low bandwidth WAN similar functionality and services for monitoring, communicating and with controlling a plurality of PTT VTGs as that provided to a user connected through a high bandwidth LAN. Thus, the appearance to the end user of LED and other indicators related to the PTT monitoring system's functionality will be the same regardless of whether mixing occurs using a proxy media service or whether the user's endpoint actually can receive/transmit and mix for presentation to the user separate streams for each monitored stream. As discussed above, these indicators may be used to indicate, for example, which stream(s) are currently being monitored, on which stream(s) a particular user communication is currently being transmitted (e.g., latch/unlatch notification), floor control, mute/unmute and other functionality. In addition, the PTT functionality for the end user may be the same regardless of whether the user is accessing the system over a WAN or a LAN. Thus, the PTT functionality provided to the end user may be independent of the user's location.

Figure 6:
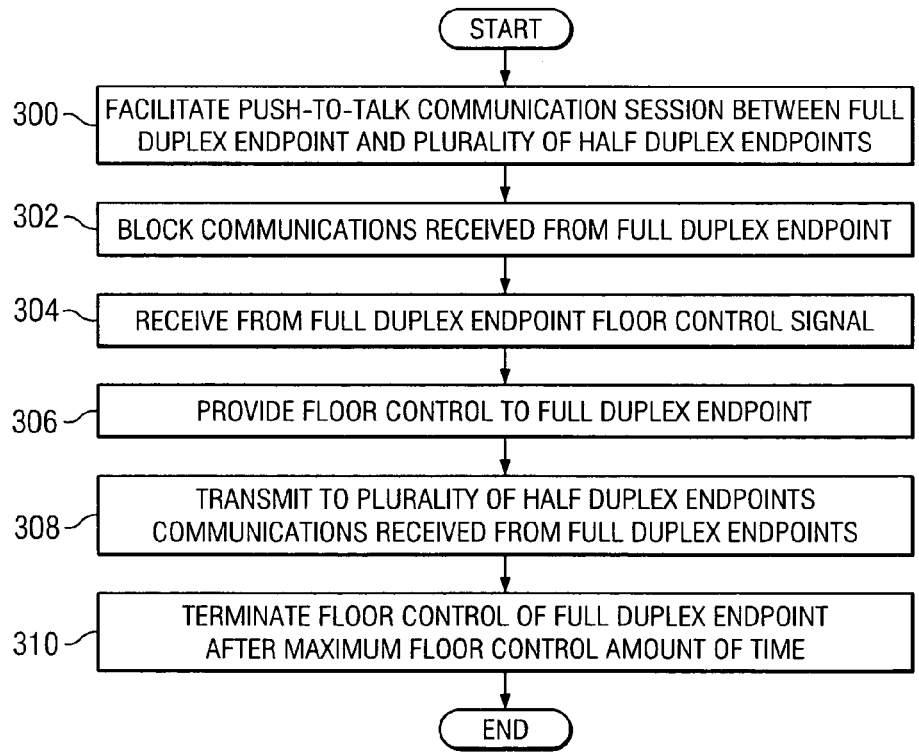
FIG. 6 illustrates a method for providing a push-to-talk communication session, in accordance with a particular embodiment.

FIG. 6 is a flowchart illustrating a method for providing a push-to-talk communication session, in accordance with a particular embodiment. The method begins at step 300 where a push-to-talk communication session among a full duplex endpoint and a plurality of half duplex endpoints is facilitated. The full duplex endpoint may support simultaneous two-way communication to and from the endpoint. The half duplex endpoints may only be able to either transmit or receive communications at one time. Communications are received from and transmitted to the full duplex endpoint along a two-way communications path. The half duplex endpoints may include endpoints of different communication networks, such as endpoints that typically communicate on different frequencies. The communication session may be facilitated using IP by an interoperability system bridging communications or controlling gateways or other network components.

At step 302, communications received from the full duplex endpoint are blocked while one of the plurality of half duplex endpoints has floor control in the communication session. At step 304, a floor control signal is received from the full duplex endpoint in the two-way communications path. The floor control signal comprises a request to transmit communications in the communication session and may comprise a DTMF signal.

At step 306, in response to receiving the floor control signal, floor control is provided to the full duplex endpoint to allow a user of the full duplex endpoint to communicate in the communication session. In some cases, a confirmation signal such as a bonk may be transmitted to the full duplex endpoint to signify that the full duplex endpoint has control of the floor. The floor control confirmation signal may include any suitable audio, visual or vibratory signal. In some embodiments, the floor control confirmation signal may be transmitted to another endpoint associated with the user of the full duplex endpoint, such as through an instant message, an e-mail, or another visual signal to a PC of the user. At step 308, communications received from the full duplex endpoint are transmitted to the plurality of half duplex endpoints.

In some cases, the full duplex endpoint is only allowed to maintain control of the floor for a certain amount of time. At step 310, floor control of the full duplex endpoint is terminated after a maximum floor control amount of time to allow the half duplex endpoints to communicate in the communication session. The maximum floor control amount of time may be determined based on a particular user of the full duplex endpoint, an event associated with the communication session or other factors.

Figure 7:
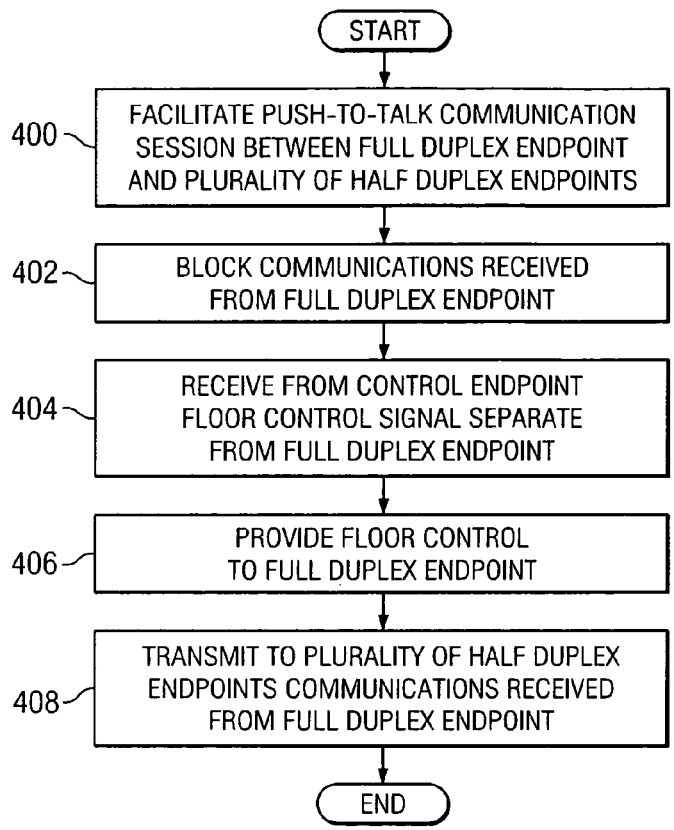
FIG. 7 illustrates a method for providing a push-to-talk communication session using a control endpoint, in accordance with a particular embodiment.

FIG. 7 illustrates a method for providing a push-to-talk communication session using a control endpoint, in accordance with a particular embodiment. The method begins at step 400 where a push-to-talk communication session among a full duplex endpoint and a plurality of half duplex endpoints is facilitated. The full duplex endpoint may support simultaneous two-way communication to and from the endpoint. The half duplex endpoints may only be able to either transmit or receive communications at one time. Communications are received from and transmitted to the full duplex endpoint along a two-way communications path. The half duplex endpoints may include endpoints of different communication networks, such as endpoints that typically communicate on different frequencies. The communication session may be facilitated using IP by an interoperability system bridging communications or controlling gateways or other network components.

At step 402, communications received from the full duplex endpoint are blocked while one of the plurality of half duplex endpoints has floor control in the communication session. At step 404, a floor control signal is received from a control endpoint separate from the full duplex endpoint. The floor control signal comprises a request to transmit communications in the communication session. In some cases the control endpoint may be a user's cell phone, PC, IP phone or PDA. In some cases the control signal may be received via a web, instant messaging, HTTP or XML interface.

At step 406, in response to receiving the floor control signal, floor control is provided to the full duplex endpoint to allow a user of the full duplex endpoint to communicate in the communication session. In some cases, a confirmation signal such as a bonk or boink may be transmitted to the user of the full duplex endpoint, for example through the full duplex endpoint, the control endpoint or otherwise, to signify that the full duplex endpoint has control of the floor. At step 408, communications received from the full duplex endpoint are transmitted to the plurality of half duplex endpoints. It should be understood that although "bonk" and "boink" are used to describe audio sounds herein, it should be understood that any suitable audio sound may be used to convey the applicable messages or indications as those conveyed by the described bonks and boinks.

In some embodiments the full duplex endpoint may be used by a plurality of users to communicate in the communication session, and each of the plurality of users may transmit a control signal to gain floor control in the session using their own respective devices, such as cell phones, PDAs, PCs and IP phones. As an example, the plurality of users may be sitting in a conference room in which the full duplex endpoint sits. When a particular user in the room desires to speak in the session, the user may transmit a floor control request signal from that user's personal endpoint. The floor signal may be received at an interoperability system facilitating the communication session which then provides the user with floor control to speak in the session. In some cases in which multiple endpoints are used to gain control of the floor to speak through a full duplex endpoint, the system may identify a particular speaker based on the endpoint used to transmit the push-to-talk floor control signal.

Figure 8:
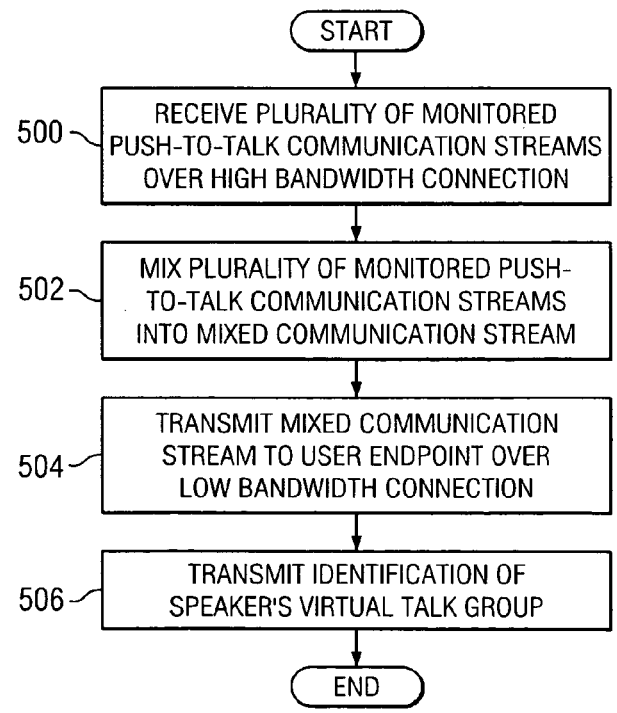
FIG. 8 illustrates a method for providing a push-to-talk proxy media service, in accordance with a particular embodiment.

FIG. 8 illustrates a method for providing a push-to-talk proxy media service, in accordance with a particular embodiment. The method begins at step 500 where a plurality of monitored communication streams, such as push-to-talk communication streams, are received over a high bandwidth connection. The communication streams may be monitored at an interoperability system that facilitates interoperable communications in virtual talk groups among endpoints of various communication networks. The monitored streams may be received at a proxy media system coupled to a high bandwidth network to which the interoperability system is coupled.

At step 502, the plurality of monitored push-to-talk communication streams are mixed into a mixed communication stream. Such mixing may take place at the proxy media system. At step 504, the mixed communication stream is transmitted over a low bandwidth connection to a user endpoint. For example, a user may be using a low bandwidth network such as a WAN to access a high bandwidth network, such as a LAN, from a home computer or other endpoint away from the LAN. The proxy media system may be coupled to the LAN and may transmit the mixed communication stream to the user over the low bandwidth WAN.

As indicated above, in some cases the monitored communication streams may each comprise a stream of a virtual talk group configured by an interoperability system. In some cases, at step 506, an identification of a particular speaker's or communication's virtual talk group may be transmitted to the user (e.g., in the mixed stream). For example, if the mixed stream at one point includes communications from VTG 4, then an identification of VTG 4 may be transmitted when such communication from VTG 4 is transmitted to the user.

In some embodiments, the user endpoint may use a separate control path to transmit instructions to the proxy media system, such as instructions to adjust the volume of a particular VTG's stream relative to other VTGs' streams when mixing the monitored communication streams. In some cases the user endpoint may be operable to receive the mixed stream on any of a number of channels, and the user endpoint may use the separate control path to transmit a channel selection for receipt of the mixed stream. In addition, in some embodiments the user endpoint may, through the control path, instruct the proxy media system to mix certain streams (e.g., streams from certain, selected VTGs) out of all the monitored communication streams received from the interoperability system.

Some of the steps illustrated in FIGS. 6-8 may be combined, modified or deleted where appropriate, and additional steps may also be added to the flowcharts. Additionally, steps may be performed in any suitable order without departing from the scope of the invention.

While various implementations and features are discussed with respect to multiple embodiments, it should be understood that such implementations and features may be combined in various embodiments. For example, features and functionality discussed with respect to a particular figure may be used in connection with features and functionality discussed with respect to another such figure according to operational needs or desires.

Although the present invention has been described in detail with reference to particular embodiments, it should be understood that various other changes, substitutions, and alterations may be made hereto without departing from the spirit and scope of the present invention. For example, although the present invention has been described with reference to a number of elements included within communication system 10 and illustrated endpoints and interoperability systems, these elements may be combined, rearranged or positioned in order to accommodate particular routing architectures or needs. In addition, any of these elements may be provided as separate external components to communication system 10 and illustrated endpoints and interoperability systems, or each other where appropriate. The present invention contemplates great flexibility in the arrangement of these elements as well as their internal components.

Numerous other changes, substitutions, variations, alterations and modifications may be ascertained by those skilled in the art and it is intended that the present invention encompass all such changes, substitutions, variations, alterations and modifications as falling within the spirit and scope of the appended claims.

What is claimed is:

1. A method for providing a push-to-talk proxy media service, comprising:
    receiving a plurality of monitored push-to-talk communication streams over a high bandwidth connection, each monitored push-to-talk communication stream comprising audio communications from a plurality of users;
    mixing the plurality of monitored push-to-talk communication streams into a mixed communication stream such that the audio communications communicated in each of the monitored push-to-talk communication streams can be heard on the mixed stream; and
    transmitting the mixed communication stream to a user endpoint over a low bandwidth connection.

2. The method of claim 1, wherein each of the push-to-talk communication streams comprises communications from a respective virtual talk group comprising a plurality of endpoints of different communication networks.

3. The method of claim 2:
    wherein the mixed communication stream comprises a first communication of a first virtual talk group; and
    further comprising transmitting an identification of the first virtual talk group when transmitting the mixed communication stream comprising the first communication.

4. The method of claim 2, wherein the plurality of monitored push-to-talk communication streams are received over the high bandwidth connection from an interoperability system operable to configure each virtual talk group to facilitate communications among its member endpoints.

5. The method of claim 2, wherein at least one of the virtual talk groups comprises a plurality of endpoints of different communication networks whose communications are mapped to a multicast IP address or SIP dialed nailed connection.

6. The method of claim 2, wherein at least one of the virtual talk groups comprises a plurality of endpoints of different communication networks whose communications are bridged.

7. The method of claim 1, wherein receiving a plurality of monitored push-to-talk communication streams comprises receiving eight monitored push-to-talk communication streams.

8. The method of claim 1, further comprising:
    receiving from the user endpoint volume instructions associated with at least one of the push-to-talk communication streams; and
    adjusting the volume of the at least one of the push-to-talk communication streams according to the instructions when mixing the plurality of monitored push-to-talk communication streams into a mixed communication stream.

9. The method of claim 1:
    further comprising receiving from the user endpoint a selection of a group of the push-to-talk communication streams for mixing; and
    wherein mixing the plurality of monitored push-to-talk communication streams into a mixed communication stream comprises mixing the selected group of the push-to-talk communication streams into a mixed communication stream.

10. The method of claim 2, further comprising
    receiving from the user over the low bandwidth connection:
        a user communication; and
        a selection of a plurality of virtual talk groups of the respective virtual talk groups; and
    transmitting the received user communication to the selected plurality of virtual talk groups over the high bandwidth connection.

11. The method of claim 10, further comprising transmitting to the user endpoint an identification of the selected plurality of virtual talk groups when transmitting the received user communication to the selected plurality of virtual talk groups.

12. The method of claim 1, further comprising presenting functionality indicators for a user at the user endpoint in the same manner as if the plurality of monitored push-to-talk communication streams had been individually transmitted over a high bandwidth connection to the user endpoint and mixed at the user endpoint for the user.

13. A system for providing a push-to-talk proxy media service, comprising:
    an interface operable to receive a plurality of monitored push-to-talk communication streams over a high bandwidth connection, each monitored push-to-talk communication stream comprising audio communications from a plurality of users;
    a mixer coupled to the interface and operable to mix the plurality of monitored push-to-talk communication streams into a mixed communication stream such that the audio communications communicated in each of the monitored push-to-talk communication streams can be heard on the mixed stream; and
    a processor operable to transmit the mixed communication stream to a user endpoint over a low bandwidth connection.

14. The system of claim 13, wherein each of the push-to-talk communication streams comprises communications from a respective virtual talk group comprising a plurality of endpoints of different communication networks.

15. The system of claim 14:
    wherein the mixed communication stream comprises a first communication of a first virtual talk group; and
    wherein the processor is further operable to transmit an identification of the first virtual talk group when transmitting the mixed communication stream comprising the first communication.

16. The system of claim 14, wherein the plurality of monitored push-to-talk communication streams are received over the high bandwidth connection from an interoperability system operable to configure each virtual talk group to facilitate communications among its member endpoints.

17. The system of claim 14, wherein at least one of the virtual talk groups comprises a plurality of endpoints of different communication networks whose communications are mapped to a multicast IP address or SIP dialed nailed connection.

18. The system of claim 14, wherein at least one of the virtual talk groups comprises a plurality of endpoints of different communication networks whose communications are bridged.

19. The system of claim 13, wherein an interface operable to receive a plurality of monitored push-to-talk communication streams comprises an interface operable to receive eight monitored push-to-talk communication streams.

20. The system of claim 13, wherein:
the interface is further operable to receive from the user endpoint volume instructions associated with at least one of the push-to-talk communication streams; and
the mixer is further operable to adjust the volume of the at least one of the push-to-talk communication streams according to the instructions when mixing the plurality of monitored push-to-talk communication streams into a mixed communication stream.

21. The system of claim 13, wherein:
the interface is further operable to receive from the user endpoint a selection of a group of the push-to-talk communication streams for mixing; and
a processor operable to mix the plurality of monitored push-to-talk communication streams into a mixed communication stream comprises a processor operable to mix the selected group of the push-to-talk communication streams into a mixed communication stream.

22. The system of claim 14, wherein:
the interface is operable to receive from the user over the low bandwidth connection:
a user communication; and
a selection of a plurality of virtual talk groups of the respective virtual talk groups; and
the processor is operable to transmit the received user communication to the selected plurality of virtual talk groups over the high bandwidth connection.

23. The system of claim 22, wherein the processor is further operable to transmit to the user endpoint an identification of the selected plurality of virtual talk groups when transmitting the received user communication to the selected plurality of virtual talk groups.

24. The system of claim 13, wherein the processor is further operable to present functionality indicators for a user at the user endpoint in the same manner as if the plurality of monitored push-to-talk communication streams had been individually transmitted over a high bandwidth connection to the user endpoint and mixed at the user endpoint for the user.

25. A system for providing a push-to-talk proxy media service, comprising:
means for receiving a plurality of monitored push-to-talk communication streams over a high bandwidth connection, each monitored push-to-talk communication stream comprising audio communications from a plurality of users;
means for mixing the plurality of monitored push-to-talk communication streams into a mixed communication stream such that the audio communications communicated in each of the monitored push-to-talk communication streams can be heard on the mixed stream; and
means for transmitting the mixed communication stream to a user endpoint over a low bandwidth connection.

26. Logic embodied in a non-transitory computer readable medium, the non-transitory computer readable medium comprising code operable to:
receive a plurality of monitored push-to-talk communication streams over a high bandwidth connection, each monitored push-to-talk communication stream comprising audio communications from a plurality of users;
mix the plurality of monitored push-to-talk communication streams into a mixed communication stream such that the audio communications communicated in each of the monitored push-to-talk communication streams can be heard on the mixed stream; and
transmit the mixed communication stream to a user endpoint over a low bandwidth connection.

27. The non-transitory computer readable medium of claim 26, wherein each of the push-to-talk communication streams comprises communications from a respective virtual talk group comprising a plurality of endpoints of different communication networks.

28. The non-transitory computer readable medium of claim 27:
wherein the mixed communication stream comprises a first communication of a first virtual talk group; and
wherein the code is further operable to transmit an identification of the first virtual talk group when transmitting the mixed communication stream comprising the first communication.

29. The non-transitory computer readable medium of claim 27, wherein the plurality of monitored push-to-talk communication streams are received over the high bandwidth connection from an interoperability system operable to configure each virtual talk group to facilitate communications among its member endpoints.

30. The non-transitory computer readable medium of claim 27, wherein at least one of the virtual talk groups comprises a plurality of endpoints of different communication networks whose communications are mapped to a multicast IP address or SIP dialed nailed connection.

31. The non-transitory computer readable medium of claim 27, wherein at least one of the virtual talk groups comprises a plurality of endpoints of different communication networks whose communications are bridged.

32. The non-transitory computer readable medium of claim 26, wherein code operable to receive a plurality of monitored push-to-talk communication streams comprises code operable to receive eight monitored push-to-talk communication streams.

33. The non-transitory computer readable medium of claim 26, wherein the code is further operable to:
receive from the user endpoint volume instructions associated with at least one of the push-to-talk communication streams; and
adjust the volume of the at least one of the push-to-talk communication streams according to the instructions when mixing the plurality of monitored push-to-talk communication streams into a mixed communication stream.

34. The non-transitory computer readable medium of claim 26:
wherein the code is further operable to receive from the user endpoint a selection of a group of the push-to-talk communication streams for mixing; and
wherein code operable to mix the plurality of monitored push-to-talk communication streams into a mixed communication stream comprises code operable to mix the selected group of the push-to-talk communication streams into a mixed communication stream.

35. The non-transitory computer readable medium of claim 26, wherein the code is further operable to:
receive from the user over the low bandwidth connection:

a user communication; and
    a selection of a plurality of virtual talk groups of the respective virtual talk groups; and
transmit the received user communication to the selected plurality of virtual talk groups over the high bandwidth connection.

36. The non-transitory computer readable medium of claim 35, wherein the code is further operable to transmit to the user endpoint an identification of the selected plurality of virtual talk groups when transmitting the received user communication to the selected plurality of virtual talk groups.

37. The non-transitory computer readable medium of claim 36, wherein the code is further operable to present functionality indicators for a user at the user endpoint in the same manner as if the plurality of monitored push-to-talk communication streams had been individually transmitted over a high bandwidth connection to the user endpoint and mixed at the user endpoint for the user.

38. A method for providing a push-to-talk proxy media service, comprising:

receiving from a user endpoint over a low bandwidth connection:
    a user communication; and
    a selection of a plurality of virtual talk groups, each virtual talk group comprising a push-to-talk communication stream comprising communications from a plurality of endpoints of different communication networks, each push-to-talk communication stream comprising audio communications from a plurality of users; and
transmitting the received user communication to each of the selected plurality of virtual talk groups over a high bandwidth connection.

39. The method of claim 38, further comprising transmitting to the user endpoint an identification of the selected plurality of virtual talk groups when transmitting the received user communication to the selected plurality of virtual talk groups.

\* \* \* \* \*